Oct. 31, 1961  J. C. BERTRAM  3,006,531
COMBINED HANDLE AND BASKET
Filed Feb. 23, 1955
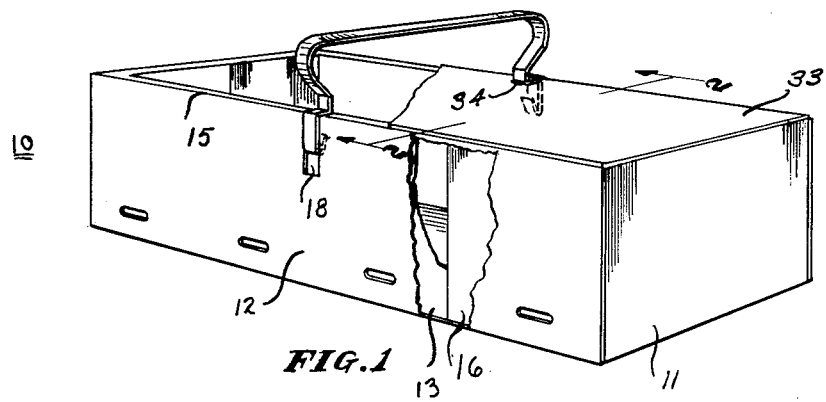
FIG.1
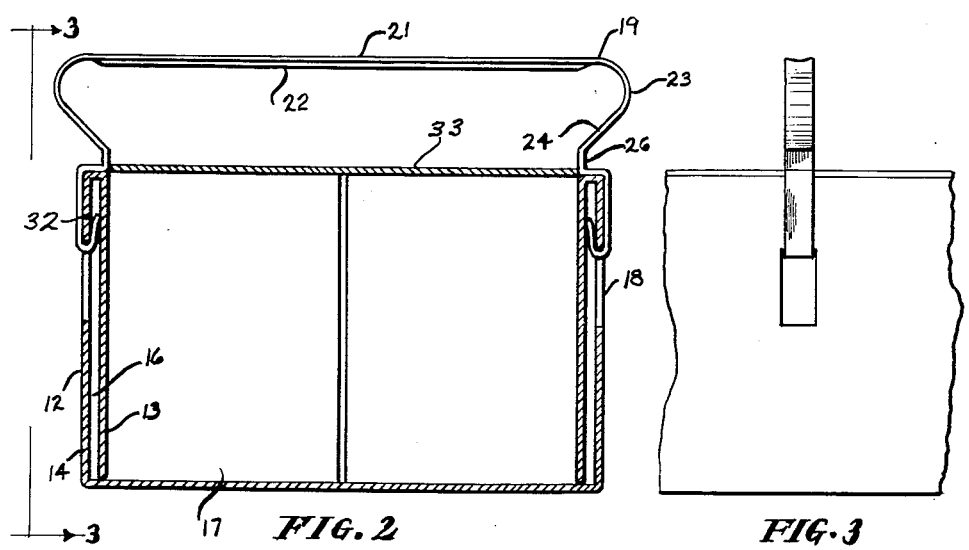
FIG.2  FIG.3
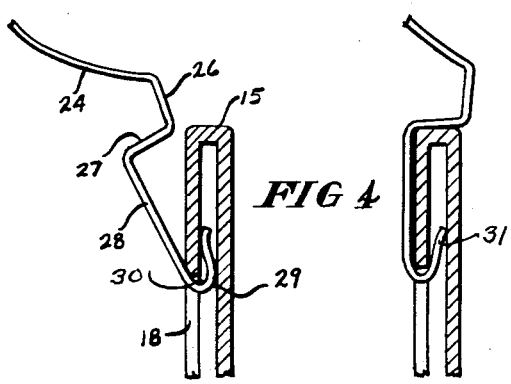
FIG 4  FIG.5
INVENTOR.
JOHN C. BERTRAM
BY
Richard H. Hayes
ATTORNEY

United States Patent Office

3,006,531
Patented Oct. 31, 1961

3,006,531
COMBINED HANDLE AND BASKET
John C. Bertram, Mayville, N.Y., assignor, by mesne assignments, to Bertram Wire Products, Inc., Buffalo, N.Y., a corporation of New York
Filed Feb. 23, 1955, Ser. No. 489,963
2 Claims. (Cl. 229—52)

This invention relates to baskets of the type generally used to contain such commodities as fruits, vegetables, etc. More particularly, the invention is directed to the combination of a corrugated board basket with a handle that may be attached at will, the handle, when attached, being rigid with respect to the basket to substantially the same extent that any permanently attached handle has been in the past.

Corrugated board baskets are now so constructed, and frequently treated, as to have a firmness and durability that, for practical purposes, is about equal to that of the common splint basket. In view of this, corrugated board baskets are being increasingly substituted for splint or plywood baskets. Attachable wire handles of the type heretofore used with splint baskets have recently been applied to corrugated board baskets. However, the fact that corrugated board, of itself, does not have the stiffness, strength, or durability of wood splints, has necessitated modifying the basket engaging portions of the wire handle to a considerable extent in order that the wire would not tend to cut through or break away that portion of the corrugated board with which it engages. Although various forms of wire handles have been devised for use with corrugated board baskets, it is believed that, basically, a wire handle is neither suitable nor satisfactory for general use when applied to a corrugated board basket.

The present invention is directed to and has for one of its objects the combination of a corrugated board basket and handle wherein the basket is so constructed as to be engageable by the ends of a handle formed from strap metal, the anchoring ends of the handle being so designed that, when engaged with the basket walls, the handle will sustain the weight of the basket and contents without breaking or cutting the comparatively weak corrugated board.

It is also an important object of the invention to provide such interfitting relationship between the basket and handle that the handle cannot inadvertently be displaced or disengaged.

Another object of the invention lies in the use of a handle formed of strap metal that provides a sufficient width and length of contact with the basket to become rigid therewith, thus eliminating the necessity of providing multiple bends such as has been required in handles formed from wire.

It is a further object of the invention to provide a handle which, when intimately engaged with the sides and top edges of the basket side walls, strengthens rather than weakens the walls at these points.

Still another object of the invention lies in the provision of a handle that may be engaged or disengaged at will, and, when engaged with a basket, provides portions that serve to hold a basket cover in place.

Other and further objects of the invention will be more fully understood from a consideration of the following specification, taken in conjunction with the accompanying drawing; in which:

FIG. 1 is a perspective view of a corrugated board basket and handle embodying the invention;

FIG. 2 is an enlarged transverse sectional view of the assembled basket and handle, being taken substantially as suggested by the line 2—2 of FIG. 1;

FIG. 3 is a fragmentary side elevational view of the assembled basket and handle, being taken substantially as suggested by the line 3—3 of FIG. 2;

FIG. 4 is an enlarged fragmentary view, partly in section, showing one of the steps by which to engage an anchor end of the handle with one of the side walls of the basket; and FIG. 5 is a view similar to FIG. 4, showing the anchor end in full engagement with the basket wall.

Referring more particularly to the drawing, the reference numeral 10 is employed to generally designate a basket and handle embodying the invention. The basket 11 is formed from corrugated board which, in itself, has comparatively little resistance to bending or twisting. Consequently, each side wall 12 is formed by inner and outer layers of board 13 and 14 that are integral along their upper edges to provide a full length ledge 15, and spaced apart a distance about equal to the board thickness. This is accomplished by providing tabs 16 integral with the vertical edges of the end walls 11. These tabs are tucked in between the boards 13 and 14 and extend only a sufficient distance from the basket ends to give desired spacing to these boards. The end walls 11 are reinforced by tabs 17 that extend from, and are directed at right angles to the inner boards 13 (see FIG. 2). Any suitable means may be employed to secure the tabs 17 against displacement from the end walls 11, and these tabs, when so secured, of course serve to hold the inner board layers 13 in proper position. At the exact center of the basket side walls 12, and a predetermined distance downwardly from the ledge 15, each of the outer board layers 14 is provided with a vertically extending slot 18.

A handle 19, adapted to cooperate with the basket to provide a useful carrying container, is formed from strap metal, the width of which is at least three times the diameter of wire handles heretofore provided. The handle comprises a substantially horizontal hand gripping portion 21. This portion is furrowed lengthwise, as suggested at 22, to provide rigidity against bowing or twisting. The ends of the gripping portion 21 continue in downwardly extending curved portions 23. Integral with these portions are inwardly inclined portions 24, their length being such that the continuing vertical flanges 26 thereof are substantially in the vertical plane of the inner edges of the inner boards 13 of the basket. The anchors of the handle continue from the flanges 26 in the form of outwardly directed, substantially right angle flanges 27 which create shoulders that are of a length approximately equal to the width of the basket ledges 15. Legs 28 extend downwardly from the ends of the flanges 27 and terminate in hooks 29. The bases of the hooks are rounded and provide pockets 30 of sufficient width to receive one thickness of the board of which the basket is formed. The return-bent portions 31 of the hooks lie within the space between the inner and outer boards 13 and 14, substantially as shown.

In order that the advantages of the invention may be more fully understood, a brief description of the assembly and relationship of the parts, when assembled, is hereinafter set out. The handle 19 is brought into a position with respect to the basket in such manner that the portion 31 of the hook 29 is vertical and may be projected through the slot 18 into the space between the inner and outer boards 13 and 14. With the handle remaining in this position, it is raised to a point such that pocket 30 engages the upper wall portion 32 of the slot 18. At this point, the handle is swung to a position such that the portion 21 becomes substantially parallel to the plane of the top of the basket and, when the handle has been moved into this position, one of the flanges 27 rests upon ledge 15.

The next step in assembling the handle with the basket is to spring the other side wall 12 of the basket slightly inwardly in order that the flange 26 of this end of the handle may move downwardly along the outer face of this wall to a position such that the hook end 31 will register with the slot 18 in this wall. Of course, it is not possible to tilt this anchor or hook portion of the handle as was done with the corresponding anchor above described. However, due to the spring-like nature of the structure of which the handle is formed, pressure may be applied to the lower portion of the leg 28 to an extent to bring the hook portion 31 into a vertical position. At this point, it is merely necessary to press upwardly on the curved end of the hook thereby engaging the hook with the outer board of this wall and allowing the flange 27 to snap into contact with the ledge 15 of this wall. When the handle, embodying the disclosed structure, has thus been engaged with the basket, it will be evident that the engagement of the hooks with the outer boards serves to sustain the basket and contents and that any tendency of the handle to swing or twist during use is prevented by reason of the contact of the legs 28 with the basket sides, in conjunction with the overlapped contact of flanges 27 with the wall ledges 15. In other words, the handle could only be swung or twisted, due to its considerable area of contact with the basket walls, by deliberately forcing one or the other edges of flanges 27 to cut into or through the wall ledges 15.

As mentioned as one of the objects of the invention, and as shown in FIG. 1 of the drawing, portions of the handle 19 also serve as a means for aligning or properly positioning a cover adapted to close the top of the basket. This cover 33, as shown in FIG. 1, rests on the ledges 15 of the side walls and the upper edges of the end walls 11. The cover includes inwardly extending notches 34 that are located at the exact center of each side edge thereof. These notches are of a depth approximately the width of the ledges 15 and the inward extensions of the handle which are defined by portions 24 and flanges 26. When it is desired to apply the cover to the basket, it is projected endwise through the upper widest portion of the handle, as defined by the curved portions 23. When the cover has been aligned with the basket opening, the notches 34 will be in alignment with the inwardly projecting parts of the handle and the cover may now be moved downwardly into contact with the basket. The flanges 26 serve to prevent lengthwise displacement of the cover and generally assist in preventing any twisting thereof. Of course, if the cover is not notched, it is desirable to make it of a width that is substantially equal to the space between the handle flanges 26 and, in this instance, only the end portions thereof will be supported by the end walls 11. However, the sides of this type of cover may have tight engagement with the flanges 26 and, by reason of such engagement, be generally prevented from endwise or lateral twisting.

Although applicant has shown and described only one modification of the invention, it will be apparent that some modifications of the curved or bent portions of the handle may be made and are contemplated as being within the spirit and scope of the invention insofar as such modifications are set out in the annexed claims.

Having thus set forth my invention, what I claim as new and for which I desire protection by Letters Patent is:

1. The combination with a corrugated box-board basket having spaced sides, each of said sides comprising spaced walls joined along their top edges by a substantially flat ledge portion, and the outer wall of each of said sides having a slot therein a short distance beneath the ledge portion thereof giving access to the space between said walls, of a detachable handle formed throughout from transversely substantially flat strap metal of a width several times the thickness thereof and comprising a generally horizontal hand gripping portion, the opposite ends of said gripping portion extending downwardly to generally vertical flange portions substantially vertically aligned with the inner walls of said sides, generally horizontal flange portions extending outwardly from said vertical flange portions substantially completely across said ledge portions, and generally vertical leg portions extending downwardly from said horizontal flange portions along the outer walls of said sides exteriorly of said basket and terminating in inwardly facing and upwardly opening hook portions projecting through said slots, said hook portions providing pockets receiving only the outer ones of said walls in slip-fitting relation therewith, and terminating between said spaced walls, whereby the interior of said basket is free and clear of said hook portions, said hook portions and said leg portions being intimately engaged with said outer walls throughout substantially the entire distance from the upper edges of said slots to said ledges and said horizontal flange portions having intimate bearing contact with said ledge portions substantially completely thereacross, thereby detachably securing said handle to said basket in rigid relation therewith and against accidental disassembly therefrom upon downward pressure on said hand gripping portion while enabling engagement and disengagement of said handle and basket at will.

2. The combination with a corrugated box-board basket having spaced sides, each of said sides comprising spaced walls joined along their top edges by a substantially flat ledge portion, and the outer wall of each of said sides having a slot therein a short distance beneath the ledge portion thereof giving access to the space between said walls, of a detachable handle formed throughout from transversely substantially flat strap metal of a width several times the thickness thereof and comprising a generally horizontal hand gripping portion, the opposite ends of said gripping portion extending downwardly to generally vertical flange portions substantially vertically aligned with the inner walls of said sides, generally horizontal flange portions extending outwardly from said vertical flange portions substantially completely across said ledge portions, and generally vertical leg portions extending downwardly from said horizontal flange portions along the outer walls of said sides exteriorly of said basket and terminating in inwardly facing and upwardly opening hook portions projecting through said slots, said hook portions providing pockets receiving only the outer ones of said walls in slip-fitting relation therewith and terminating between said spaced walls whereby the interior of said basket is free and clear of said hook portions, said hook portions and said leg portions being intimately engaged with said outer walls throughout substantially the entire distance from the upper edges of said slots to said ledges and said horizontal flange portions having intimate bearing contact with said ledge portions substantially completely thereacross, thereby detachably securing said handle to said basket in rigid relation therewith, and against accidental disassembly therefrom upon downward pressure on said hand gripping portion while enabling engagement and disengagement of said handle and basket at will, wherein said slots have a normally vertical extent substantially equal to at least the height of those parts of said hook portions which extend between said spaced walls when said handle is assembled on said basket, thereby facilitating engagement and disengagement of said handle and basket.

References Cited in the file of this patent

UNITED STATES PATENTS

| | | |
|---|---|---|
| Re. 12,060 | Haas | Nov. 25, 1902 |
| 1,210,127 | Wood | Dec. 26, 1916 |
| 1,931,329 | Sherman | Oct. 17, 1933 |
| 2,066,258 | Evans | Dec. 29, 1936 |
| 2,123,771 | Crowell | July 12, 1938 |
| 2,152,933 | Talbot | Apr. 4, 1939 |
| 2,161,639 | Schmidt | June 6, 1939 |
| 2,167,936 | Brooks | Aug. 1, 1939 |
| 2,195,070 | Backert | Mar. 26, 1940 |